United States Patent [19]

Payne et al.

[11] Patent Number: 5,079,410
[45] Date of Patent: Jan. 7, 1992

[54] POWER CONTROL SYSTEM ADAPTABLE TO A PLURALITY OF SUPPLY VOLTAGES

[75] Inventors: Thomas R. Payne; Steven A. Rice, both of Louisville, Ky.

[73] Assignee: General Electric Company, Louisville, Ky.

[21] Appl. No.: 645,715

[22] Filed: Jan. 25, 1991

[51] Int. Cl.$^5$ .............................................. H05B 1/02
[52] U.S. Cl. .................................. 219/506; 219/492; 219/486; 307/41
[58] Field of Search ............... 219/506, 10.55 B, 497, 219/492, 483, 486; 307/39–41

[56] References Cited

U.S. PATENT DOCUMENTS

| | | | |
|---|---|---|---|
| 2,812,413 | 11/1957 | Brown | 219/20 |
| 3,921,058 | 11/1975 | Tanaka et al. | 323/19 |
| 4,028,613 | 6/1977 | Stiller et al. | 323/19 |
| 4,266,118 | 5/1981 | Takase et al. | 219/506 |
| 4,289,948 | 9/1981 | Jurek et al. | 219/110 |
| 4,340,807 | 7/1982 | Raskin et al. | 219/497 |
| 4,599,504 | 7/1986 | Ito | 219/10.77 |
| 4,786,799 | 11/1988 | Welte, Jr. et al. | 219/486 |
| 4,816,647 | 3/1989 | Payne | 219/483 |

FOREIGN PATENT DOCUMENTS 3212765  4/1982  Fed. Rep. of Germany.

*Primary Examiner*—Mark H. Paschall
*Attorney, Agent, or Firm*—H. Neil Houser; Radford M. Reams

[57] ABSTRACT

An electronic control arrangement for controlling the power applied to an electrical load, in which the electronic control includes in its memory a predetermined power control parameter look-up table associated with each of a plurality of potentially applicable voltage ranges. Each table contains the appropriate control parameters for controlling the load when the associated one of the input voltage ranges is applied to the load. The control, in response to an input signal identifying the voltage to be applied, selects the control parameters from the look-up table associated with the identified voltage. This signal may be generated by voltage sensing circuitry which monitors the supply voltage, or by a manually adjustable circuit which enables presetting for a particular supply voltage.

13 Claims, 12 Drawing Sheets

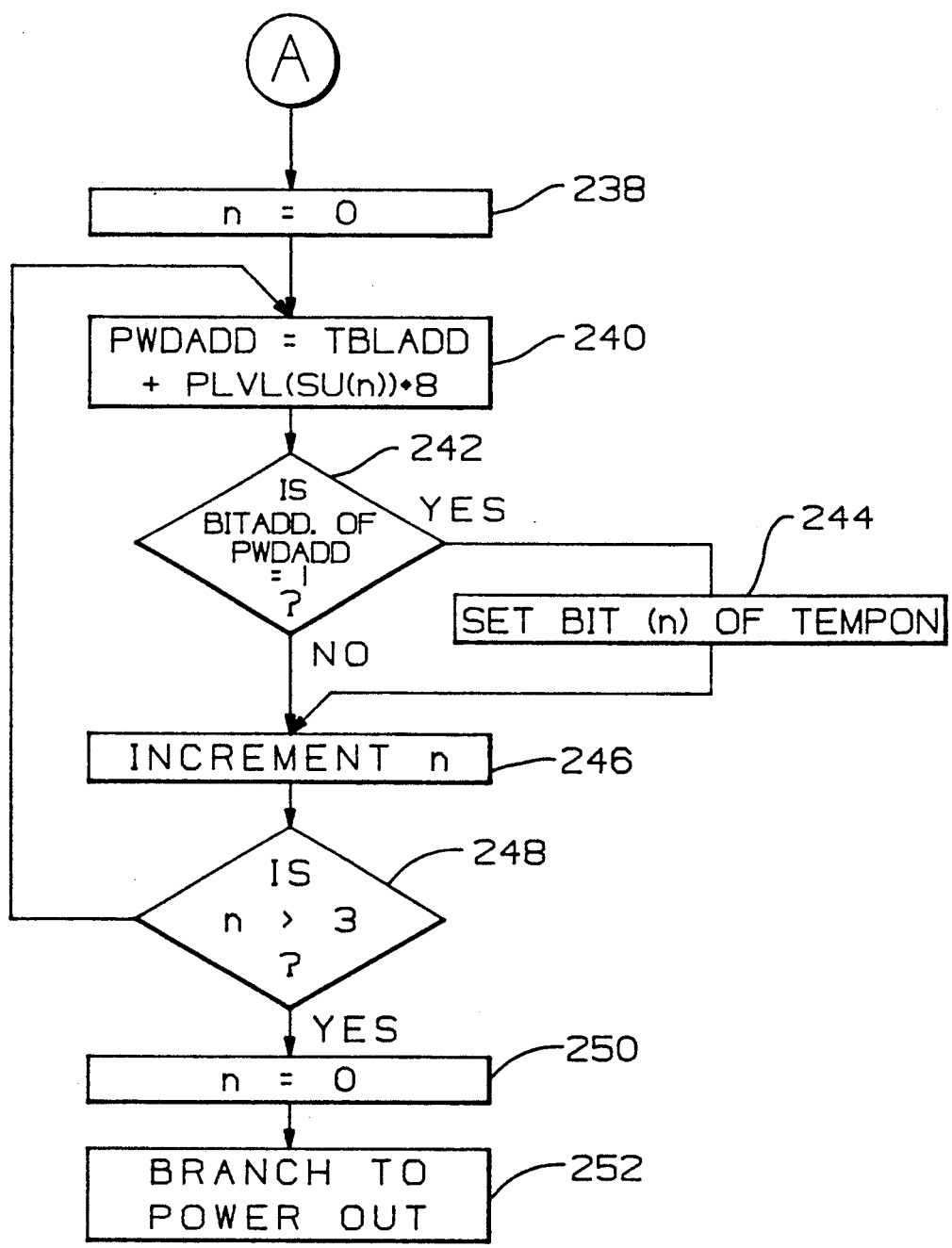

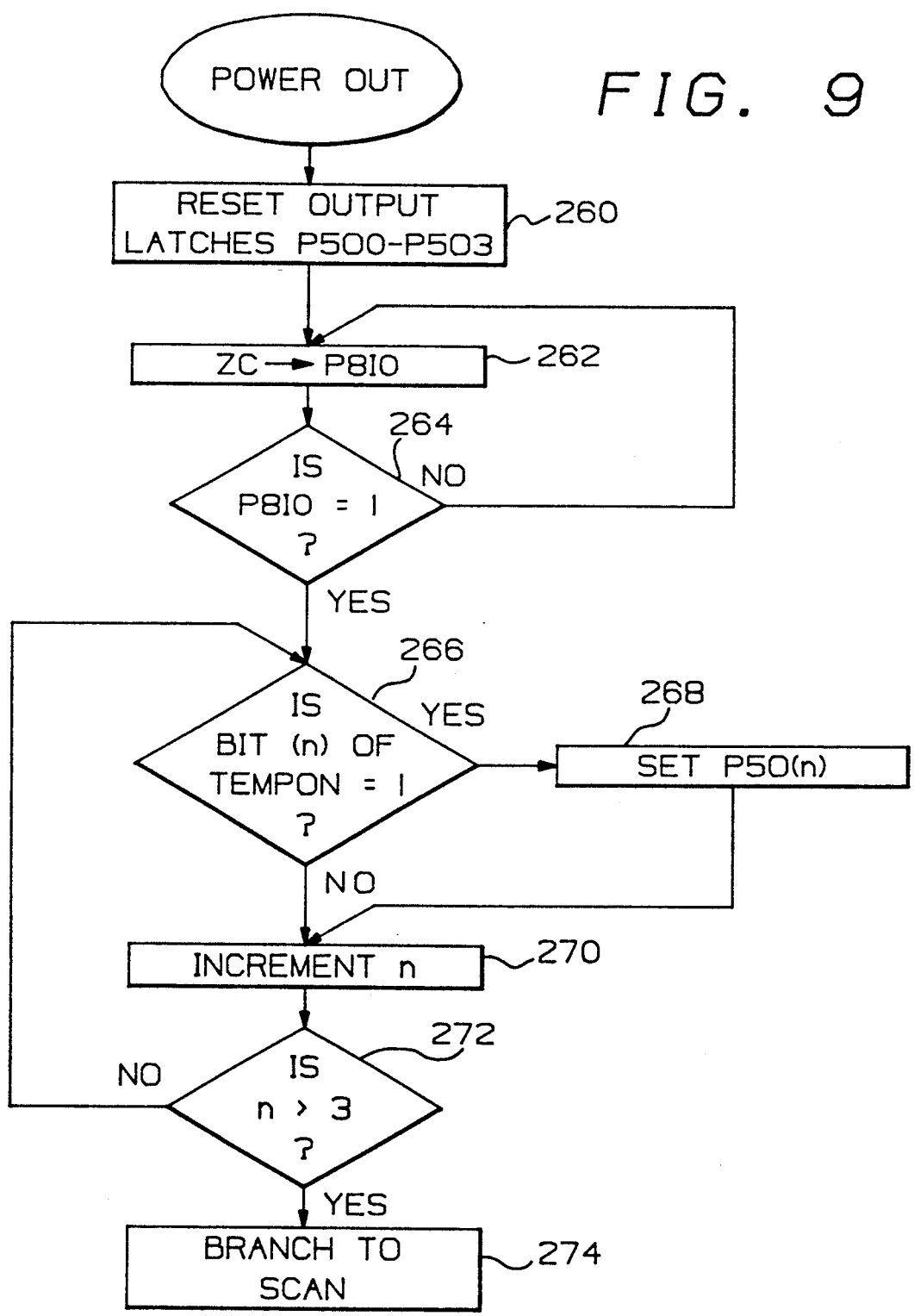

POWER CONTROL SYSTEM ADAPTABLE TO A PLURALITY OF SUPPLY VOLTAGES

BACKGROUND OF THE INVENTION

This invention relates generally to electronic power control systems for electrical loads which may be subject to a plurality of different supply voltages or to substantial swings relative to a nominal supply voltage.

In different geographic areas within the U.S. as well as among various countries throughout the world, the nominal supply voltages can differ significantly. Typical nominal RMS supply voltages are 208, 220, 240 volts. In addition, voltages can vary from the nominal supply value. In resistive heating elements such as may be employed in cooking appliances, relatively large output power changes can occur with relatively small changes in input voltages since output power varies with the square of the voltage. Similar changes can occur with non-resistive loads such as electric motors for washing machines, or inverter circuits for induction cooktops.

Rather than design a different control system for each different nominal supply voltage it would be desirable to provide a single cost effective control system for an appliance, for example, which would allow the appliance to be used with any of the various power supplies. To be attractive for such applications the control system should either automatically adapt to the applied voltage, or at least be readily and simply pre-settable to various supply voltages in the factory or during installation.

In addition, it would be desirable to provide a control system for an appliance which automatically compensates for temporary over-voltage conditions without any apparent difference in performance thereby preventing damage to the appliance, avoiding a potential safety hazard, all without interrupting use and enjoyment of the appliance.

It is therefore an object of the present invention to provide a control system for an electrical load such as in an appliance which automatically adapts to a variety of supply voltages and compensates for significant swings in a given nominal voltage supply.

It is another object of the present invention to provide a control system for an electrical load such as in an appliance which can be simply preset to a variety of different supply voltages either in the factory or in the home during installation.

It is yet another object of the present invention to provide a control system for an electrical load such as an appliance which automatically compensates for over-voltage condition without interrupting or otherwise adversely affecting operation of the load.

SUMMARY OF THE INVENTION

These and other objects are accomplished in accordance with the present invention by providing an electronic control arrangement for controlling the power applied to an electrical load, in which the control means, preferably in the form of a microprocessor, includes in its memory a predetermined power control parameter look-up table associated with each of a plurality of potentially applicable voltage ranges. Each table contains the appropriate control parameters for controlling power applied to the load when the associated one of the input voltage ranges is applied to the load. The control arrangement also includes means for providing a signal to the control means identifying the voltage to be applied. The control means is operative in response to this input from the voltage identifying means, to select the control parameters from the look-up table associated with the identified voltage. In a preferred form of the invention, the control parameters include control words, the bit pattern of which establish the power repetition rate or power switching rate for the load.

In accordance with one aspect of the invention the means for identifying the supply voltage comprises an input voltage sensing circuit which identifies that one of a plurality of discrete voltage ranges which contains the sensed voltage.

In accordance with another aspect of the invention the voltage identifying means comprises a manually or mechanically adjustable circuit which can be selectively preset to generate a signal representing a selected one of a plurality of voltage ranges which contains the anticipated supply voltage. In a preferred form of this aspect of the invention, simple jumper connectors are employed to provide a binary input signal.

In accordance with another aspect of the invention, the voltage identifying means is employed to detect over-voltage conditions and the control means includes in its memory a power control parameter look-up table for normal operating conditions and another table for use when over-voltage conditions are detected.

When applied to a cooking appliance of the type having at least one electric heating unit, the power control arrangement in accordance with the invention includes user operable selection means such as a touch pad array to enable the user to select one of a plurality of power settings for the heating unit and control means such as a microprocessor having stored in its memory a plurality of look-up tables, one for each anticipated supply voltage range. Each look-up table contains a power control word for each power setting. The bit pattern of each word establishes the power pulse repetition rate or switching rate appropriate to operate the heating unit at the power level associated with the selected setting when subjected to the corresponding supply voltage. A voltage sensing circuit monitors the line voltage and provides a signal to the microprocessor identifying the range containing the sensed voltage. The microprocessor controller then selects the power control word for the user selected power setting from the appropriate control word table and controls energization of the heating unit according to the bit pattern of the selected word. By this arrangement, the control system automatically adapts to the applied supply voltage.

In a variation of the invention as applied to such a cooking appliance, the voltage sensing circuit is replaced by a manually or mechanically adjustable circuit which is selectively presettable to one of a plurality of anticipated supply voltage such as, for example 208, 220, 240 or 260 volts.

BRIEF DESCRIPTION OF THE DRAWINGS

FIGS. 8A and 8B are flow diagrams of the PSET routine incorporated in the control program of the microprocessor in the circuit of FIG. 4;

FIG. 9 is a flow diagram of the Power Out routine incorporated in the control program of the microprocessor in the circuit of FIG. 4;

DETAILED DESCRIPTION OF THE ILLUSTRATIVE EMBODIMENT

Figure 1:
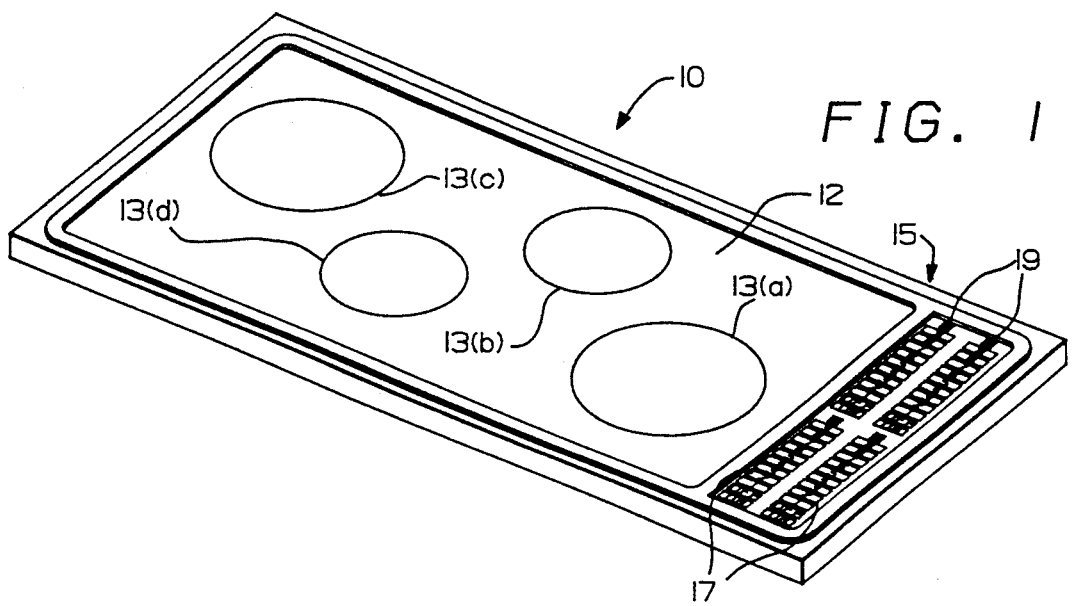
FIG 1 is a perspective view of a portion of a cooktop illustratively embodying the power control system of the present invention.

In the description to follow, the control arrangement of the present invention is applied in a power control system for an electric cooktop appliance. The invention may, however, be employed to control a variety of other types of electrical loads as well and its description herein in conjunction with the cooking appliance is not to be interpreted as limiting the invention to such appliances. FIG. 1 illustrates a glass-ceramic cooktop appliance designated generally 10. Cooktop appliance 10 has a generally planar glass-ceramic cooking surface 12. Circular patterns 13(a)–13(d) identify the relative lateral positions of each of four heating units (not shown) located directly underneath surface 12. A control and display panel generally designated 15 includes a complete set of touch control keys 17 and a seven-segment digital LED display element 19 for each heating unit.

In the description to follow, the designators 14(a)–14(d) shall be understood to refer to the heating units disposed under patterns 13(a)–13(d) respectively. Each of heating units 14(a)–14(d) comprises an open coil electrical resistance element designed when energized at its rated power to radiate primarily in the infrared (1–3 micron) region of the electromagnetic spectrum. Such heating units are described in greater detail in the commonly assigned U.S. Pat. No. 4,786,799. Each of units 14(a)–14(d) are designed to operate at 100% of rated power when energized by an input voltage of 180 volts RMS.

Figure 2:
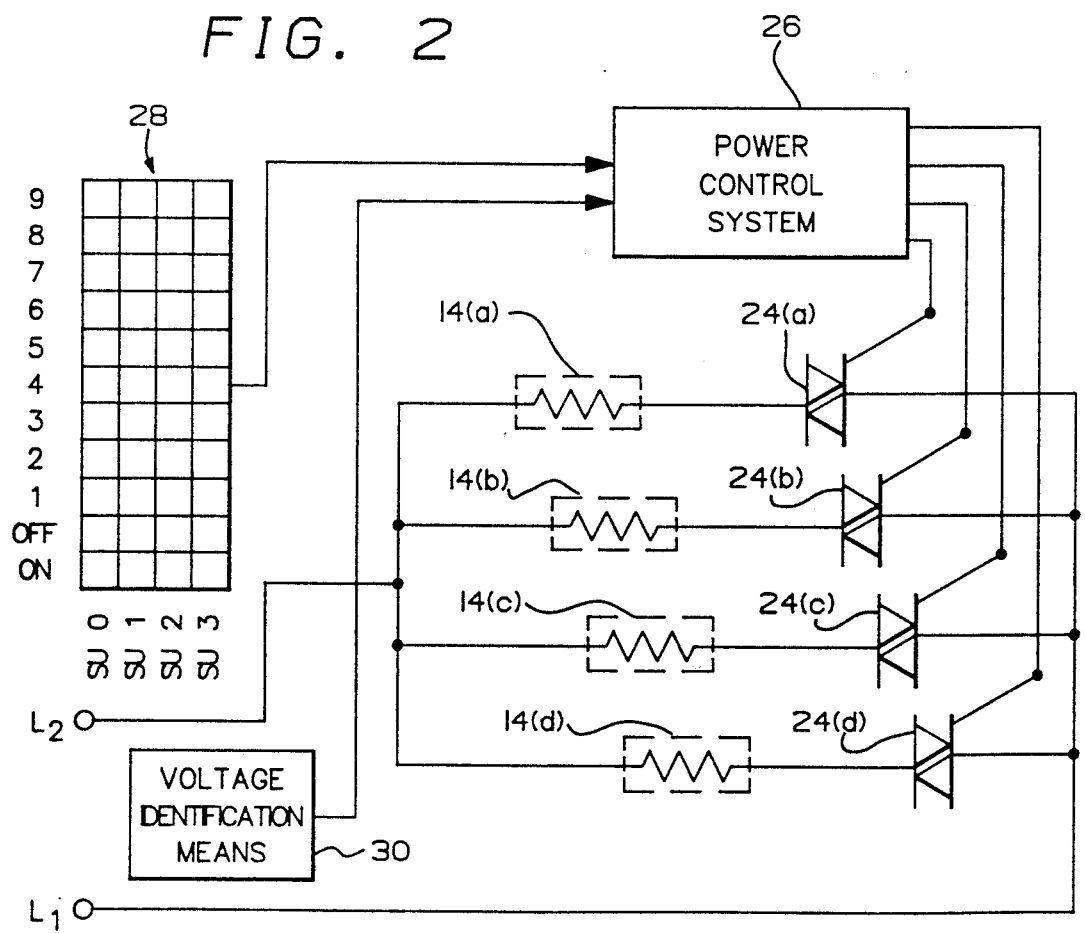
FIG. 2 is a functional block diagram of the power control circuitry for the cooktop of FIG. 1.

FIG. 2 illustrates in simplified schematic form, an embodiment of a control arrangement in accordance with the present invention for cooktop 10. Each of four heating units 14(a)–14(d) is coupled to a standard 60 Hz AC power source, which could be 208, 220, 240 or 260 volts, via power lines L1 and L2 through one of four triacs 24(a)–24(d) respectively, the heating circuits being connected in parallel arrangement with each other. Triacs 24(a)–24(d) are conventional thyristors capable of conducting current in either direction irrespective of the voltage polarity across their main terminals when triggered by either a positive or negative voltage applied to the gate terminals.

The power control system 26 controls the power applied to the heating units by controlling the rate at which gate pulses are applied to the triac gate terminals in accordance with power setting selections for each heating unit entered by user actuation of tactile touch membrane switch keyboard 28 comprising touch keys 17 (FIG. 1). The columns of keys designated SU0 through SU3 (FIG. 2) provide the control inputs for heating units 14(a)–14(d) respectively.

In the illustrative embodiment gate signals are applied to triacs 24(a)–24(d) to couple power pulses to the heating units. Each pulse is a full cycle of the 60 Hz AC power signal; however, power signals of different frequencies, such as 50 Hz, could be similarly used.

Power control system 26 is arranged to operate each heating unit at one of a plurality of discrete power levels. In the illustrative embodiment fifteen non-Off power levels are implementable by the control system. Nine power settings corresponding to power levels 1–9, plus Off and On are selectable for each heating unit by user actuation of the keys in keyboard 28. The six highest power levels designated A–F are not user selectable. These levels are available to adjust the power applied to the heating unit such as, for example, to overdrive the heating units when operating in a transient heat up mode to rapidly heat the units to radiant temperature as described in commonly assigned co-pending U.S. patent application Ser. No. 000,426, filed Jan. 5, 1987, the disclosure of which is hereby incorporated by reference.

Power pulse repetition rate control is a power control technique disclosed in commonly assigned U.S. Pat. No. 4,256,951. Each power level has associated with it a power pulse repetition rate expressed as the ratio of ON power pulses or cycles to OFF cycles, and a power pulse code referred to hereinafter as a power control word. The bit pattern of the power control word establishes the sequence of ON cycles and OFF cycles for that repetition rate.

Tables I–IV provide examples of such repetition rates and codes for each of the fifteen power levels when operating with a supply voltage of 208, 220, 240 and 260 volts RMS respectively.

TABLE I

| | | | | 208 Volt Supply | | | | | |
|---|---|---|---|---|---|---|---|---|---|
| Power Settings | Power Level | Watts | RMS Volts | Power Pulse Reptition Rate | | Power Pulse Code | | | Address |
| OFF/ON | 0 | 0 | 0 | — | 0000 | 0000 | 0000 | 0000 | TABLEA |
| 1 | 1 | 44 | 26 | 1/64 | 8000 | 0000 | 0000 | 0000 | TABLEA +8 |
| 2 | 2 | 131 | 45 | 3/64 | 8000 | 0800 | 0080 | 0000 | TABLEA +10 |
| 3 | 3 | 219 | 58 | 5/64 | 8008 | 0080 | 0080 | 0800 | TABLEA +18 |

TABLE I-continued

208 Volt Supply

| Power Settings | Power Level | Watts | RMS Volts | Power Pulse Repetition Rate | Power Pulse Code | | | | Address |
|---|---|---|---|---|---|---|---|---|---|
| 4 | 4 | 394 | 78 | 9/64 | 8088 | 8080 | 8080 | 8080 | TABLEA +20 |
| 5 | 5 | 570 | 94 | 13/64 | 8888 | 8088 | 8088 | 8088 | TABLEA +28 |
| 6 | 6 | 876 | 116 | 20/64 | A888 | A888 | A888 | A888 | TABLEA +30 |
| 7 | 7 | 1183 | 135 | 27/64 | AAA8 | AAA8 | AAA8 | A8A8 | TABLEA +38 |
| 8 | 8 | 1577 | 156 | 36/64 | EAAA | EAAA | EAAA | EAAA | TABLEA +40 |
| 9 | 9 | 2103 | 180 | 48/64 | EEEE | EEEE | EEEE | EEEE | TABLEA +48 |
|   | A | 2234 | 186 | 51/64 | FEEE | FEEE | FEEE | EEEE | TABLEA +50 |
|   | B | 2322 | 189 | 53/64 | FEFE | FEEE | FEEE | FEEE | TABLEA +58 |
|   | C | 2454 | 195 | 56/64 | FEFE | FEFE | FEFE | FEFE | TABLEA +60 |
|   | D | 2585 | 200 | 59/64 | FFFE | FFFE | FFFE | FEFE | TABLEA +68 |
|   | E | 2673 | 203 | 61/64 | FFFF | FFFE | FFFE | FFFE | TABLEA +70 |
|   | F | 2804 | 208 | 64/64 | FFFF | FFFF | FFFF | FFFF | TABLEA +78 |

TABLE II

220 Volt Supply

| Power Settings | Power Level | Watts | RMS Volts | Power Pulse Repetition Rate | Power Pulse Code | | | | Address |
|---|---|---|---|---|---|---|---|---|---|
| OFF/ON | 0 | 0 | 0 | — | 0000 | 0000 | 0000 | 0000 | TABLEB |
| 1 | 1 | 49 | 28 | 1/64 | 8000 | 0000 | 0000 | 0000 | TABLEB +8 |
| 2 | 2 | 147 | 48 | 3/64 | 8000 | 0800 | 0080 | 0000 | TABLEB +10 |
| 3 | 3 | 245 | 61 | 5/64 | 8008 | 0080 | 0080 | 0800 | TABLEB +18 |
| 4 | 4 | 392 | 78 | 8/64 | 8080 | 8080 | 8080 | 8080 | TABLEB +20 |
| 5 | 5 | 588 | 95 | 12/64 | 8088 | 8088 | 8088 | 8088 | TABLEB +28 |
| 6 | 6 | 882 | 117 | 18/64 | A888 | 8888 | A888 | 8888 | TABLEB +30 |
| 7 | 7 | 1176 | 135 | 24/64 | A8A8 | A8A8 | A8A8 | A8A8 | TABLEB +38 |
| 8 | 8 | 1618 | 158 | 33/64 | EAAA | AAAA | AAAA | AAAA | TABLEB +40 |
| 9 | 9 | 2108 | 180 | 43/64 | EEEA | EEEA | EEEA | EAEA | TABLEB +48 |
|   | A | 2255 | 187 | 46/64 | EEEE | EEEA | EEEE | EEEA | TABLEB +50 |
|   | B | 2451 | 194 | 50/64 | FEEE | EEEE | FEEE | EEEE | TABLEB +58 |
|   | C | 2598 | 200 | 53/64 | FEFE | FEEE | FEEE | FEEE | TABLEB +60 |
|   | D | 2794 | 208 | 57/64 | FFFE | FEFE | FEFE | FEFE | TABLEB +68 |
|   | E | 2941 | 213 | 60/64 | FFFE | FFFE | FFFE | FFFE | TABLEB +70 |
|   | F | 3137 | 220 | 64/64 | FFFF | FFFF | FFFF | FFFF | TABLEB +78 |

TABLE III

240 Volt Supply

| Power Settings | Power Level | Watts | RMS Volts | Power Pulse Repetition Rate | Power Pulse Code | | | | Address |
|---|---|---|---|---|---|---|---|---|---|
| OFF/ON | 0 | 0 | 0 | — | 0000 | 0000 | 0000 | 0000 | TABLEC |
| 1 | 1 | 58 | 30 | 1/64 | 8000 | 0000 | 0000 | 0000 | TABLEC +8 |
| 2 | 2 | 117 | 42 | 2/64 | 8000 | 0000 | 8000 | 0000 | TABLEC +10 |
| 3 | 3 | 233 | 60 | 4/64 | 8000 | 8000 | 8000 | 8000 | TABLEC +18 |
| 4 | 4 | 350 | 73 | 6/64 | 8080 | 0080 | 8080 | 0080 | TABLEC +20 |
| 5 | 5 | 584 | 95 | 10/64 | 8088 | 8080 | 8088 | 8080 | TABLEC +28 |
| 6 | 6 | 875 | 116 | 15/64 | 8888 | 8888 | 8888 | 8088 | TABLEC +30 |
| 7 | 7 | 1226 | 137 | 21/64 | A8A8 | A888 | A888 | A888 | TABLEC +38 |
| 8 | 8 | 1576 | 156 | 27/64 | AAA8 | AAA8 | AAA8 | A8A8 | TABLEC +40 |
| 9 | 9 | 2101 | 180 | 36/64 | EAAA | EAAA | EAAA | EAAA | TABLEC +48 |
|   | A | 2392 | 192 | 41/64 | EEEA | EAEA | EAEA | EAEA | TABLEC +50 |
|   | B | 2626 | 201 | 45/64 | EEEE | EEEA | EEEA | EEEA | TABLEC +58 |
|   | C | 2918 | 212 | 50/64 | FEEE | EEEE | FEEE | EEEE | TABLEC +60 |
|   | D | 3210 | 222 | 55/64 | FEFE | FEFE | FEFE | FEEE | TABLEC +68 |
|   | E | 3443 | 230 | 59/64 | FFFE | FFFE | FFFE | FEFE | TABLEC +70 |
|   | F | 3735 | 240 | 64/64 | FFFF | FFFF | FFFF | FFFF | TABLEC +78 |

TABLE IV

260 Volt Supply

| Power Settings | Power Level | Watts | RMS Volts | Power Pulse Repetition Rate | Power Pulse Code | | | | Address |
|---|---|---|---|---|---|---|---|---|---|
| OFF/ON | 0 | 0 | 0 | — | 0000 | 0000 | 0000 | 0000 | TABLED |
| 1 | 1 | 68 | 33 | 1/64 | 8000 | 0000 | 0000 | 0000 | TABLED +8 |
| 2 | 2 | 137 | 46 | 2/64 | 8000 | 0000 | 8000 | 0000 | TABLED +10 |
| 3 | 3 | 205 | 56 | 3/64 | 8000 | 0800 | 0080 | 0000 | TABLED +18 |
| 4 | 4 | 411 | 80 | 6/64 | 8080 | 0080 | 8080 | 0080 | TABLED +20 |
| 5 | 5 | 616 | 98 | 9/64 | 8088 | 8080 | 8080 | 8080 | TABLED +28 |
| 6 | 6 | 890 | 117 | 13/64 | 8888 | 8088 | 8088 | 8088 | TABLED +30 |

TABLE IV-continued

| | | | | 260 Volt Supply | | | | | |
|---|---|---|---|---|---|---|---|---|---|
| Power Settings | Power Level | Watts | RMS Volts | Power Pulse Reptition Rate | Power Pulse Code | | | | Address |
| 7 | 7 | 1164 | 134 | 17/64 | A888 | 8888 | 8888 | 8888 | TABLED +38 |
| 8 | 8 | 1575 | 156 | 23/64 | A8A8 | A8A8 | A8A8 | A888 | TABLED +40 |
| 9 | 9 | 2123 | 181 | 31/64 | AAAA | AAAA | AAAA | AAA8 | TABLED +48 |
| | A | 2397 | 192 | 35/64 | EAAA | EAAA | EAAA | AAAA | TABLED +50 |
| | B | 2671 | 203 | 39/64 | EAEA | EAEA | EAEA | EAAA | TABLED +58 |
| | C | 2945 | 213 | 43/64 | EEEA | EEEA | EEEA | EAEA | TABLED +60 |
| | D | 3219 | 223 | 47/64 | EEEE | EEEE | EEEE | EEEA | TABLED +68 |
| | E | 3493 | 232 | 51/64 | FEEE | FEEE | FEEE | EEEE | TABLED +70 |
| | F | 3767 | 241 | 55/64 | FEFE | FEFE | FEFE | FEEE | TABLED +78 |

The power pulse codes in these tables represent 64-bit control words in hexadecimal format. A control word is provided in each Table for each of the fifteen available power levels. These control words are used to implement the pulse repetition rates for the selected power level. The basic control period comprises 64 full cycles of the 60 Hz power signal. The distribution of ON power pulses over this 64 cycle control period for each power level is defined by the bit pattern of the associated control word. ON pulses or cycles are represented by logical one bits and Off cycles by logical zero bits respectively. The repetition rates for the user selectable power settings have been empirically established to provide a range of power settings for good cooking performance in the appliance of the illustrative embodiment. The bit patterns for each repetition rate have been selected to minimize the number of successive idle or OFF cycles.

Figure 3:
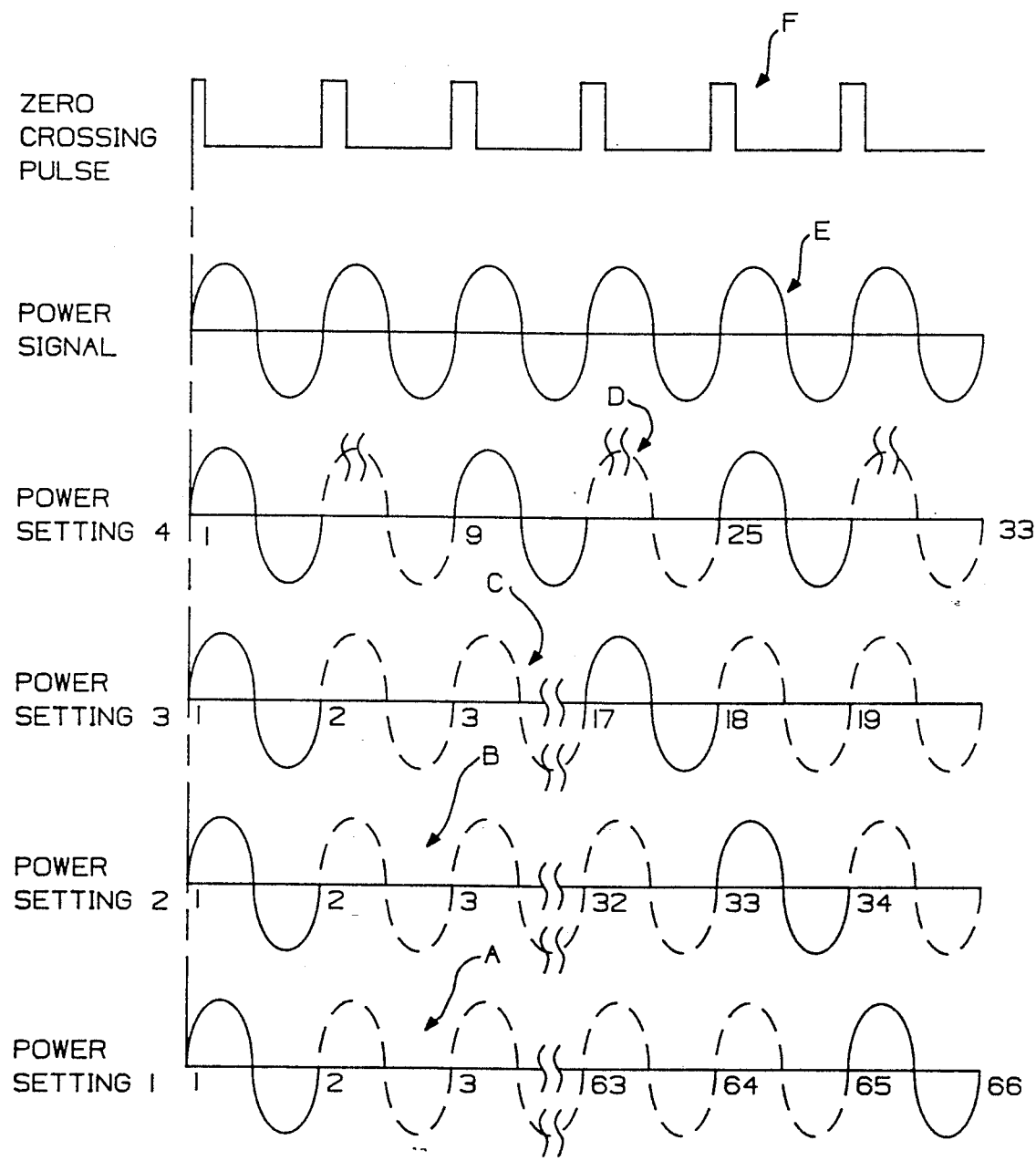
FIG. 3 illustrates power signals corresponding to various operator selectable power settings and a timing signal for synchronizing control system operation with the power signal.

As shown in Table III, which contains the control words to be used with a nominal 240 volt supply, the pulse repetition rate for the first four power settings range from 1 ON pulse per 64 power cycles for power setting 1, the lowest non-Off power setting, to 6 ON power pulse for every 64 cycles for power level 4. In FIG. 3 wave forms A–D represent the voltage signal applied to the heating unit for each of power settings 1 through 4 respectively. Wave form E represents the power signal appearing across lines L1 and L2. Power pulses or ON cycles are represented by full lines. Those cycles of the power signal during which the triac is non-conductive are shown in phantom lines.

As is also disclosed in the aforementioned U.S. patent application Ser. No. 000,426, power pulse repetition rate control can be used to vary the effective RMS voltage applied to the heating unit, provided the time base is properly selected, because when power switching is conducted at a switching rate which provides On and Off times which do not exceed the same order of magnitude as the thermal time constant of the wire heating material, the voltage in terms of heating effect or output power is approximately equal to the RMS value of the supply voltage reduced by a factor equal to the square root of the ratio of the number of On cycles to the total number of cycles in the control period. This relationship is expressed in the equation listed below.

$$V_{EFF\ RMS} = V_{supply} \times \left( \frac{\text{Number of On Cycles}}{\text{Total Cycles in Control Period}} \right)^{\frac{1}{2}}$$

The thermal time constant of heating element wire is on the order of 800 milliseconds, varying slightly with wire radius. Thus, a control period of 64 cycles is of the same order of magnitude as the thermal time constant for the heating unit of the illustrative embodiment. Using the foregoing equation, a ratio of 36 On cycles to 64 total cycles provides an effective RMS voltage of 180 volts for the standard 240 volt RMS 60 Hz domestic supply.

As shown in Table III the maximum user selectable power setting in the illustrative embodiment is power setting 9. The corresponding power level is defined by a repetition rate of 36 On cycles per 64 total control period cycles.

Repetition rate control can similarly be employed to obtain the same RMS voltage from different peak input voltages. This application of repetition rate control is advantageously employed in accordance with the present invention to provide a power control system which is readily adaptable to a plurality of different supply voltages.

By way of illustration, referring to Tables I–IV, it can be seen that the 180 volts for power setting 9 is achieved by repetition rates of 48, 43, 36 and 31 ON cycles to 64 total cycles for 208, 220, 240 and 260 volt supplies respectively. The repetition rates for the other user selectable power settings are similarly selected to provide approximately the same equivalent or effective RMS voltage for each of the user selectable settings for each of the four nominal input voltages.

Having provided a look-up table for each of these nominal supply voltages, it remains to provide means for identifying the particular one of these voltages which is being or will be applied in a given situation. Referring again to FIG. 2, voltage identification means 30 is operative to generate a signal representing that one of a plurality of predetermined input voltage ranges containing the externally supplied input voltage. In accordance with the present invention, the voltage identification means 30 can be provided in the form of means for sensing the actual applied voltage or in the form of a manually adjustable means such as could be employed to preset the system in the factory. In either case, the identifying means provides an input to the control system signifying which of the voltages is to be applied. The control system then selects the power control word for the selected power setting from the look-up table associated with the voltage identified by the identifying means.

In the embodiments next described, voltage identification means 30 provides a signal representing one of four voltage ranges, namely less than 210 volts, 210–225 volts, 225–245 volts and greater than 245 volts, containing the four nominal voltages 208, 220, 240 and 260 respectively.

Automatic Voltage Identification Embodiment

Figure 4:
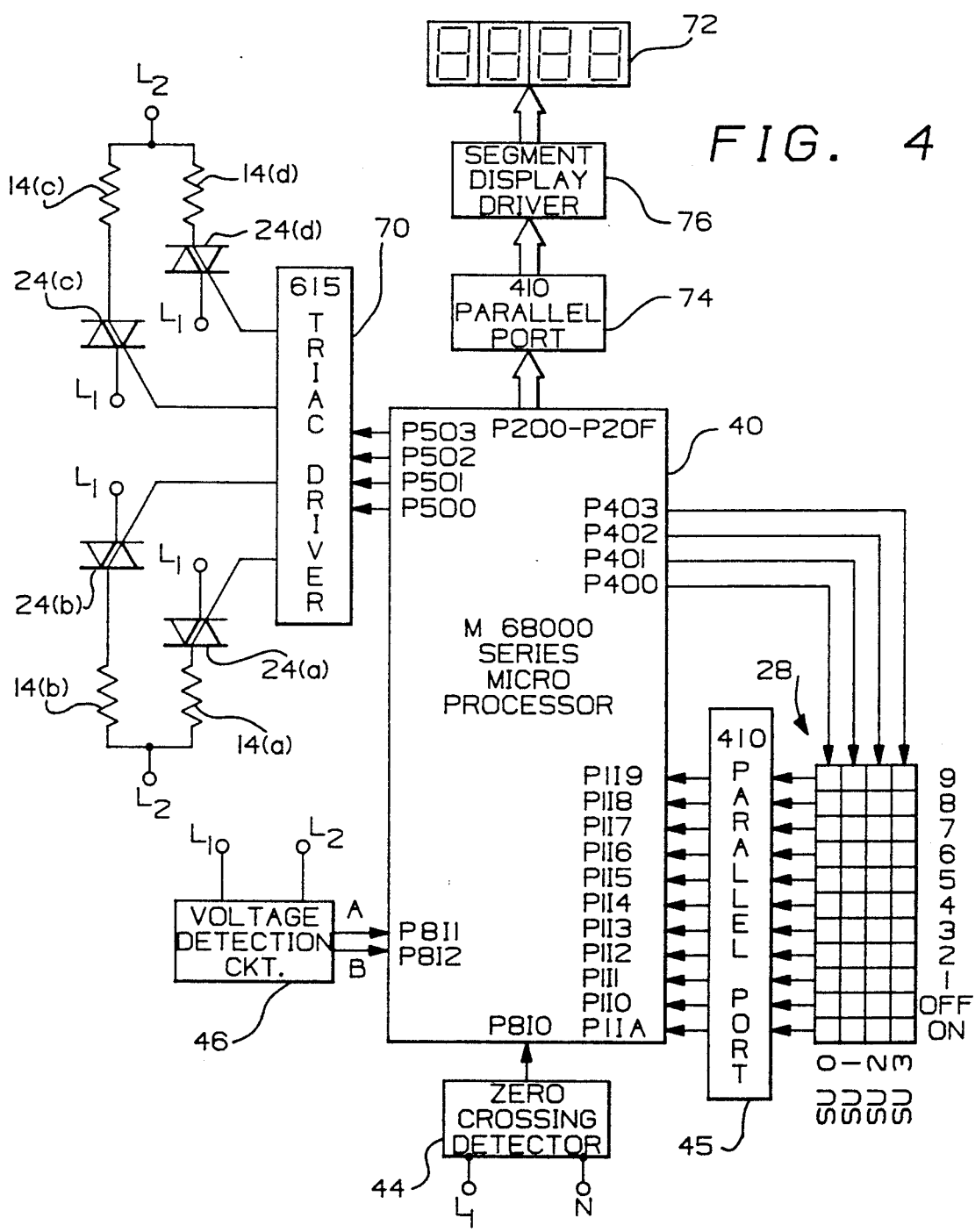
FIG. 4 is a simplified schematic diagram of a control circuit illustratively embodying the power control system of the present invention as embodied in the cooktop of FIG. 1.

FIG. 4 schematically illustrates an embodiment of a power control circuit for the cooktop of FIG. 1 which performs power control functions in accordance with the present invention. In this control system power control is provided electronically by microprocessor 40. Microprocessor 40 is a M68000 series microprocessor of the type commercially available from Motorola. Microprocessor 40 has been customized by permanently configuring its read only memory to implement the control scheme of the present invention.

As previously described with reference to FIG. 2, keyboard 28 is a conventional tactile touch type entry system. The keyboard array comprises four columns of 11 keys each. Columns for controlling heating elements are designated SU0 through SU3 respectively. The keys enable a user to select power levels 1 through 9 in addition to On and Off for each of the four heating units. Keyboard 28 has one input line for each column commonly shared by all keys in that column and 11 output lines, one for each row of keys. Each particular column of keyboard 28 is scanned by periodically generating scan pulses sequentially at outputs P400 through P403 of microprocessor 40. These pulses are transmitted as they appear to the corresponding column input lines of keyboard 28. This voltage is transmitted essentially unchanged to the output lines of all the untouched keys. The output of an actuated key will differ, signifying actuation of the key in that row and column.

In this manner each column of keyboard 28 is scanned for a new input periodically at a rate determined by the control program stored in the ROM of microprocessor 40. As will become apparent from the description of the control routines which follow, each column is scanned once every four complete power cycles of the power signal appearing on lines L1 and N. The output from keyboard 28 is coupled to input ports P1I0–P1IA of microprocessor 40 via a 410 parallel port interface circuit 45.

A zero crossing signal marking zero crossings of the power signal appearing on lines L1 and N from the power supply is input to microprocessor 40 at input port P8I0 from a conventional zero crossing detector circuit 44. The zero crossing signal from circuit 44 is illustrated as wave form F of FIG. 3. The pulses mark the positive going zero crossings of the power signal across lines L1 and N of the AC power supply. The zero crossing signals are used to synchronize the triggering of the triacs with zero crossings of the power signal and for timing purposes in the control program executed by microprocessor 40.

Figure 5:
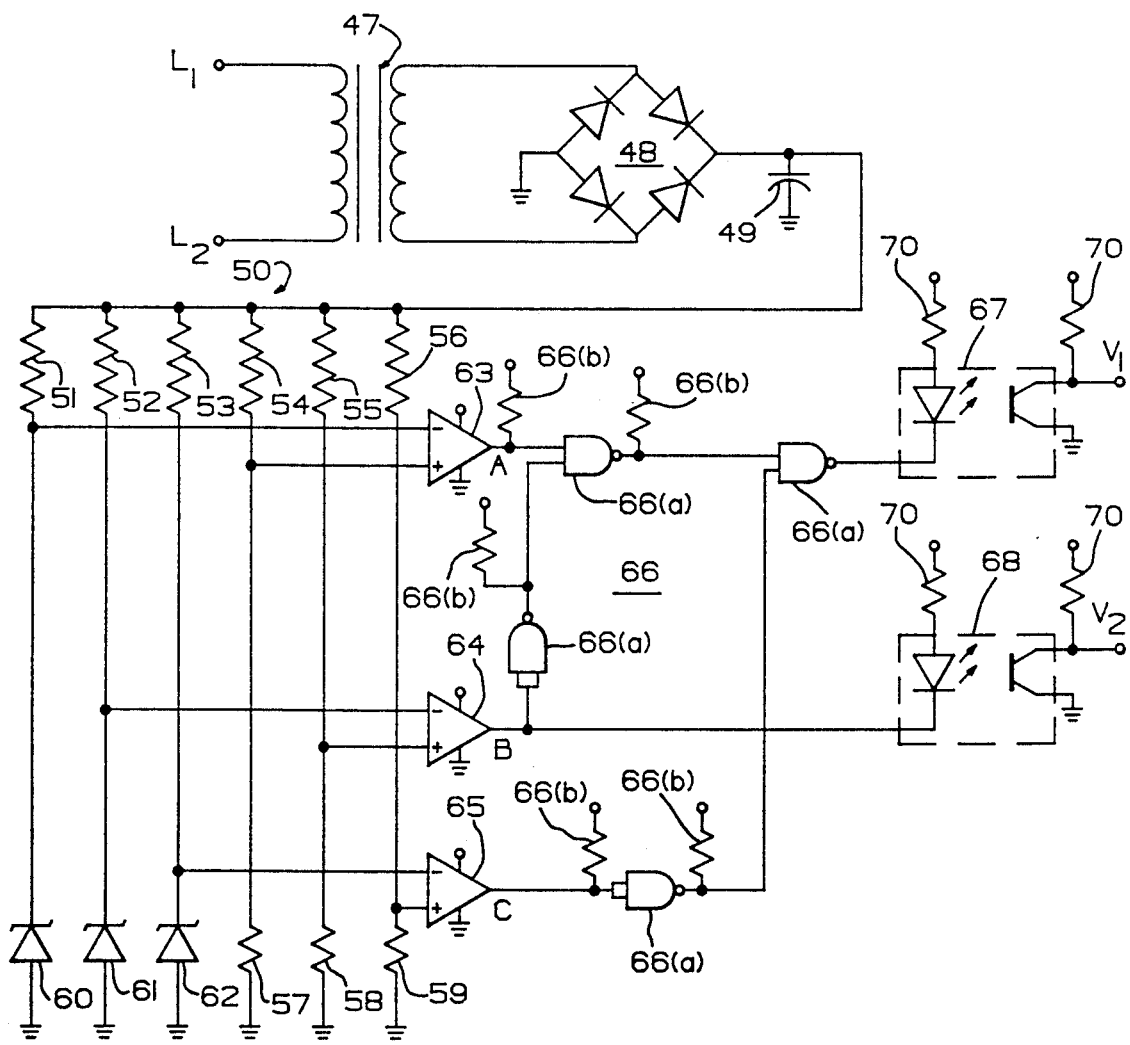
FIG. 5 is a simplified schematic of an embodiment of the voltage detection circuit represented as a block in the circuit of FIG. 4.

In this embodiment the voltage identification means is provided in the form of voltage detection circuit 46. The circuitry for detection circuit 46 is shown in greater detail in FIG. 5. The line voltage appearing across L1 and L2 is applied to the primary of 10:1 step down transformer 47. The output from the secondary is rectified and smoothed by full wave rectifying diode bridge 48 and capacitor 49. The resulting DC voltage representing the line voltage is applied to resistance network 50 comprising current limiting resistors 51, 52, and 53, and voltage dividing resistors 54, 55, 56, 57, 58 and 59. Current limiting resistors 51, 52 and 53 are coupled to system ground via zener diodes 60, 61 and 62 having zener voltages of 2, 4 and 6 volts respectively, to provide fixed reference voltages for comparators 63, 64 and 65 respectively. The junctions of resistors 54 and 57, 55 and 58, and 56 and 59 are connected to the noninverting inputs of comparators 63, 64 and 65 respectively representing the sensed line voltage.

Logic circuitry, designated generally 66 comprising NAND gates 66(a) and pull-up resistors 66(b), links the outputs of comparators 63, 64 and 65 to the gate inputs of opto-isolater devices 67 and 68. A 5 volt dc voltage is applied to resistors 66(b) in conventional fashion. The 5 volt dc voltage is similarly applied to pull up resistors 70. Outputs $V_1$ and $V_2$ representing that one of the four detectable input voltage ranges which contains the voltage applied across L1 and L2 are applied to input ports P8I1 and P8I2 of microprocessor 40 (FIG. 4). The truth table relating the binary signal comprising bits $V_1$ and $V_2$ to the input voltage is given in Table V.

TABLE V

| | Voltage Detection Truth Table | | | | |
|---|---|---|---|---|---|
| Line Voltage v | A | B | C | $V_1$ | $V_2$ |
| v < 210 | 0 | 0 | 0 | 0 | 0 |
| 210 ≦ v < 225 | 1 | 0 | 0 | 1 | 0 |
| 225 ≦ v < 245 | 1 | 1 | 0 | 0 | 1 |
| 245 ≦ v | 1 | 1 | 1 | 1 | 1 |

Referring again to FIG. 4, microprocessor 40 transmits triac trigger signals from I/0 ports P500 through P503 to the gate terminals of triacs 24(a)–24(d) respectively via a conventional 615 triac driver circuit 70. Triac driver circuit 70 amplifies the outputs from ports P500–P503 of microprocessor 40 and isolates the chip from the power line. Display data is transmitted from I/O ports P200–P20F. Display 72 is a conventional four digit display, each digit comprising a 7-segment LED display. Display information is coupled from I/O ports P200–P20F to the display segments via a conventional 410 parallel port interface circuit 74 and a conventional segment display decoder driver circuit 76 in a manner well known in the art.

Control Program

It will be recalled that microprocessor 40 is customized to perform the control functions of this invention by permanently configuring the ROM to implement a predetermined set of instructions. FIGS. 6–9 are flow diagrams which illustrate the control routines implemented in microprocessor 40 to obtain, store and process the input data from the keyboard and generate control signals for triggering the triacs in a manner which provides the power pulse repetition rate required to apply appropriate power levels to each of the heating units. From these diagrams one of ordinary skill in the programing art could prepare a set of instructions for permanent storage in the ROM of microprocessor 40 which would enable the microprocessor to perform the control functions in accordance with this invention.

The control program comprises a set of predetermined control instructions stored in the read only memory (ROM) of microprocessor 40. A separate file in the random access memory (RAM) of the microprocessor is associated with each of heating units 14(a)–14(d). Each file stores the control information for its associated heating unit which is acted upon by the instructions in the ROM. Execution of the control program is synchronized with the 60 Hz power signal such that the set of control instructions in the ROM is cycled through once during each cycle of the power signal. A file register common to all four files functioning as a four count ring counter is incremented once during each pass through the control program. The count of this file register identifies the RAM file to be operated on by the control instructions during the ensuing pass through the control program. By this arrangement the control program is executed for any one particular heating unit once every four cycles of the 60 Hz power signal.

The control program is logically divided into a set of sub-routines which includes the Scan routine, the Keyboard Decode routine, the PSET routine and the Power Out routine. It will be appreciated that other sub-routines may also be included to perform control functions unrelated to the present invention.

The Scan routine (FIG. 6), which contains the file register identifying the RAM file to be acted upon during the ensuing pass through the control program, sets the scan line for the keyboard column associated with the heating unit which is the subject of the current pass through the routine, reads the input from the keyboard for that heating unit, and stores the user selected power setting selection information in temporary memory.

The Keyboard Decode routine (FIGS. 7A and 7B) validates keyboard entries and updates the control variable representing the power level selected by the user as appropriate to reflect the most recent valid user input for that heating unit.

While the determination of what power level to be applied to a heating unit is determined only during execution of the control program for that particular heating unit, a power control decision must be made for the ensuing power cycle for each of the units during each pass through the program. The PSET routine (FIGS. 8A and 8B) obtains power level information from each file during each pass through the routine, identifies the applied voltage and performs a table lookup in accordance with the present invention for each heating unit, checks the appropriate bit for the power level control word for each heating unit, and generates a four bit trigger control word which identifies which heating units are to be triggered on and which are to be off during the next power cycle. This four bit control word is then used by the Power Out routine (FIG. 12) which monitors the input from the zero crossing circuit and triggers those triacs associated with heating units to be energized during the next power cycle into conduction upon detection of the next occurring positive going zero crossing of the power signal.

Figure 6:
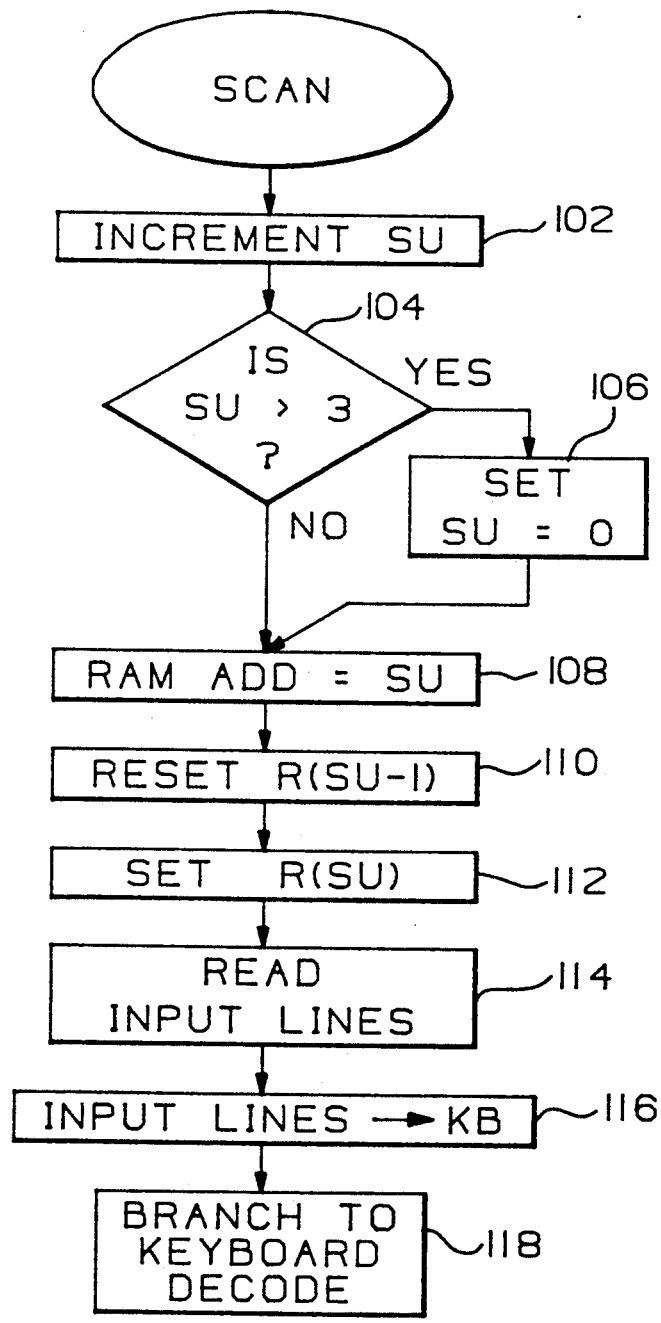
FIG. 6 is a flow diagram of the Scan routine incorporated in the control program for the microprocessor in the circuit of FIG. 4.

SCAN Routine-FIG. 6

The function of this routine is to address the appropriate RAM file for the current pass through the program, set the appropriate scan line for the keyboard, and read in the input information from the keyboard for the heating unit associated with the designated RAM file. RAM file register SU functions as a four count ring counter which counts from 0 to 3. Counts 0 through 3 of the SU counter identify RAM files for surface units 14(a)-14(d) respectively.

Upon entering the Scan routine the register SU is incremented (Block 102) and Inquiry 104 determines if SU is greater than 3. If so, the counter is reset to 0 (Block 106). Next the address of the RAM file to be acted upon during this pass through the control program is set equal to SU (Block 108). The scan line set during the previous pass through the control program designated R(SU-1) is reset (Block 110). The scan line associated with the surface unit for the current pass through the program designated R(SU) is set (Block 112). The data of input lines P1I0 through A are read in, conveying the current input information for this RAM file from keyboard 28 (Block 114) and this information is stored as variable KB (Block 116). The program then branches (Block 118) to the Keyboard Decode routine of FIGS. 7A and 7B.

Figure 7A:
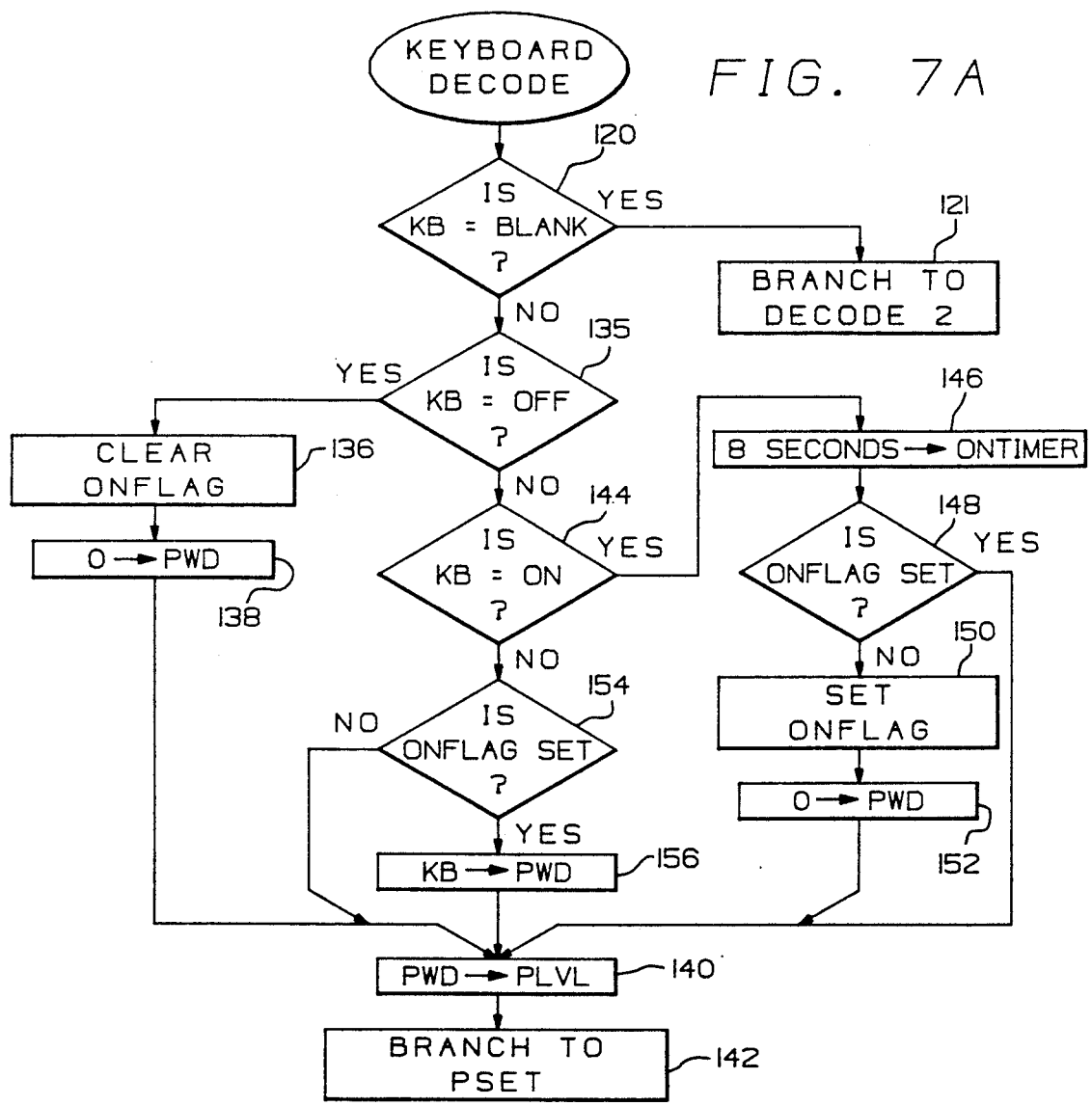
FIGS. 7A and 7B are flow diagrams of the Keyboard Decode routine incorporated in the control program for the microprocessor in the circuit of FIG. 4.
Figure 7B:
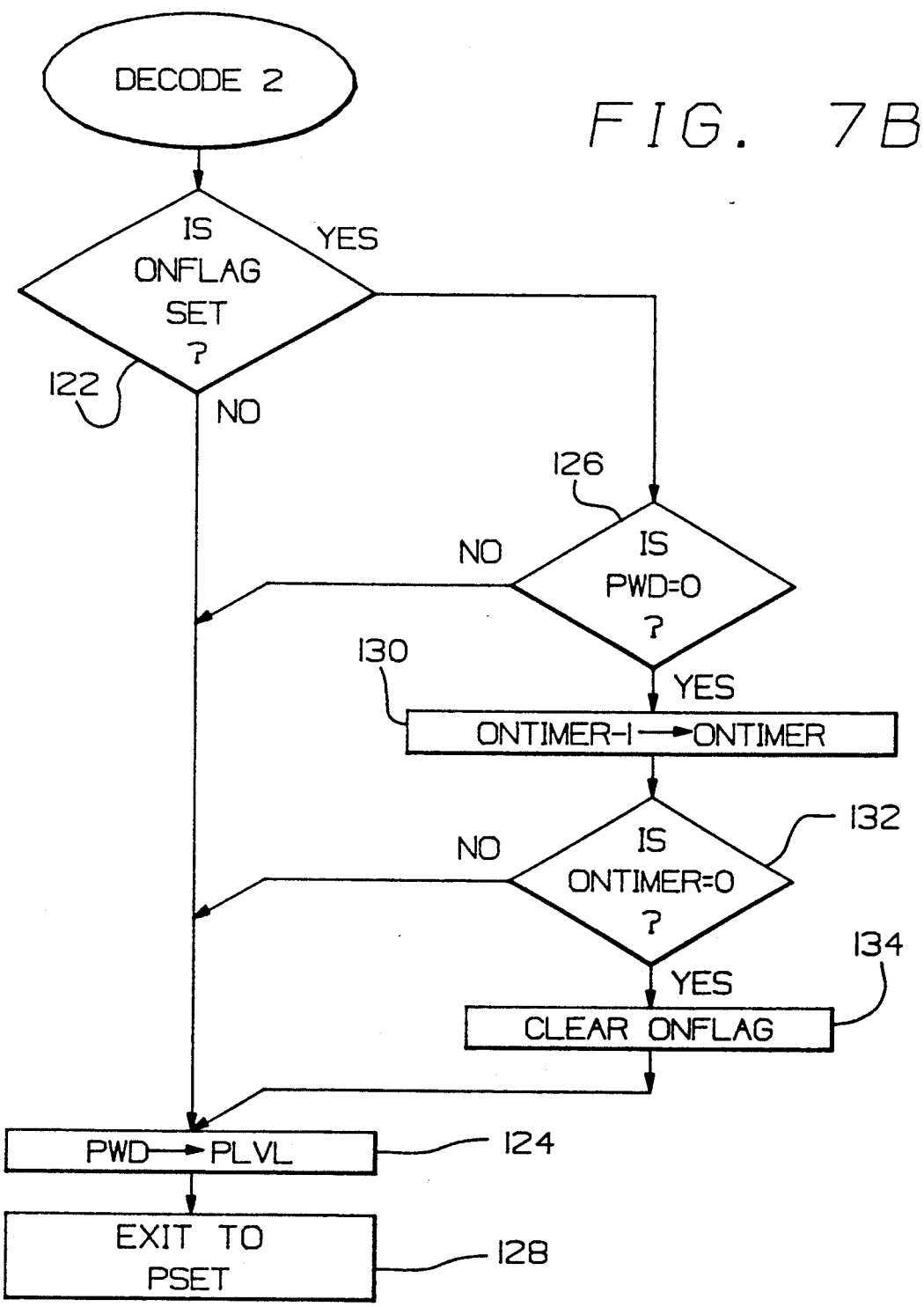

KEYBOARD DECODE Routine-FIGS. 7A and 7B

The Keyboard Decode routine validates inputs from keyboard 28 and updates the user selected power setting variable PWD accordingly. The routine first determines if the new keyboard entry is a blank signifying no input, an Off entry, an On entry, or one of the power levels 1 through 9. To be valid when switching the heating unit from Off to another power setting, the On key must be actuated first followed by the desired power setting. The power setting must be entered within 8 seconds of actuation of the On key. If not, the On key must be re-actuated.

The variable PWD represents the user selected power setting. PWD is only changed in response to user inputs. The variable PLVL is introduced in this routine to represent the power level to be actually applied to the heating unit. PLVL is assigned the value of PWD in this sub-routine. However, as described in the hereinbefore referenced U.S. patent application Ser. No. 000,426, other sub-routines not relevant to the present invention could be included in the control program, which might change PLVL to a value other than that corresponding to the user selected level.

In the Keyboard Decode routine the eight second period for entering a valid power setting after actuation of the On key is established using a flag designated the On flag and a timer or counter designated the ONTIMER. The On flag is set when the On key is actuated and is only reset in response to actuation of the Off key or timing out of ONTIMER.

Figure 8A:
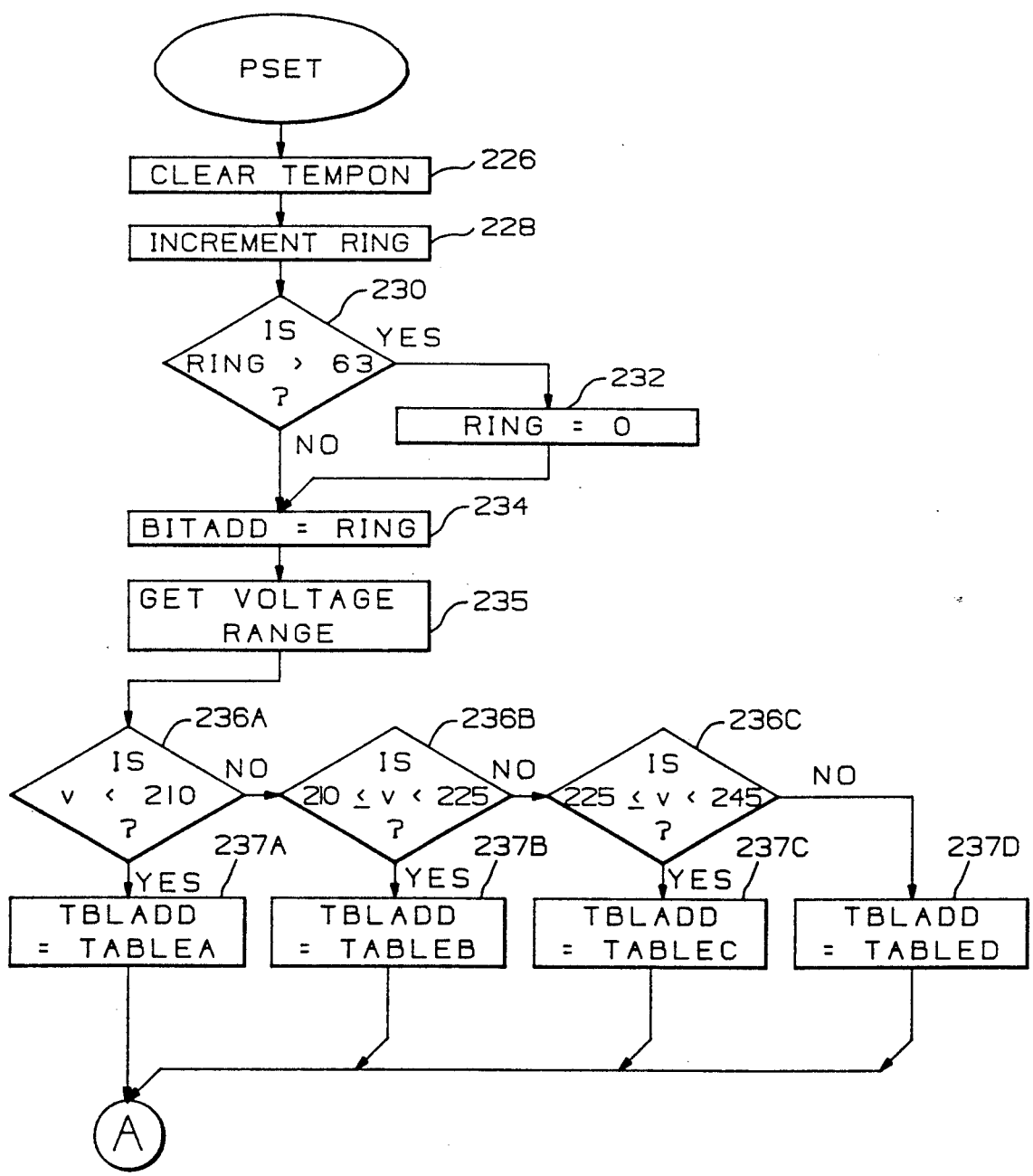

Referring to the flow diagram of FIGS. 7A and 7B, Inquiry 120 first determines if the KB represents a blank signifying that no key is presently actuated. If KB is blank, the system branches (Block 121) to the Decode 2 sub-routine (FIG. 7B). In the Decode 2 sub-routine Inquiry 122 determines if the On flag is set. If the On flag is not set, the power level stored in PWD is assigned to the variable PLVL (Block 124). If the On flag is set, Inquiry 126 determines if the previously selected power setting presently stored as PWD is the Off setting. If not, the system is presently operating at one of power settings 1 through 9 and the program proceeds to assign the value of PWD to PLVL (Block 124) and branches (Block 128) to the PSET routine (FIGS. 8A and 8B). If Inquiry 126 determines that PWD equals 0 representing an Off power level, this indicates that the user has switched from Off to On and the ONTIMER is decremented (Block 130). When ONTIMER equals 0 as determined at Inquiry 132 signifying that the time to enter a valid power level has expired, the On flag is cleared (Block 134) and program proceeds to Block 124 as before.

Referring again to FIG. 7A, if KB is not a blank, Inquiry 135 determines if the new entry is the Off setting. If so, the On flag is cleared (Block 136) and the variable PWD is assigned the value 0 representing the Off power setting (Block 138). The variable PLVL is assigned the value of PWD (Block 140) and the program branches (Block 142) to the PSET routine of FIGS. 8A and 8B. If KB is not Off, Inquiry 144 determines if the new entry is the On setting. If it is, the ONTIMER is re-initialized (Block 146). Inquiry 148 checks the state of the On flag. If set, the program proceeds to Block 140. If not set, the flag is set (Block 150) and the PWD is assigned the value 0 which corresponds also to the On setting (Block 152). The program then proceeds to Block 140 as before.

If the answer to Inquiry 144 is No, signifying that the new entry is one of power levels 1 through 9, Inquiry 154 checks the state of the On flag. If it is not set, signifying the user has attempted to go from Off to a power level without first actuating the On key, the new entry is ignored and the program proceeds to Block 140 with PWD unchanged. If the On flag is set, the power setting input is valid, and variable PWD is assigned the new value corresponding to the new entry KB (Block 156).

Having assigned the value of PWD representing the most recent valid user selected power setting to the variable PLVL the system proceeds to the PSET routine (FIGS. 8A and 8B).

PSET Routine-FIGS. 8A and 8B

Having established the appropriate power level to be applied to the heating unit, it remains to identify the supply voltage, select the power control word for the appropriate power level from the table associated with the identified supply voltage, and make the triac triggering decision for the next occurring power signal cycle. This decision is made for all four heating units during each pass through the control program. Use is made in this routine of information from each of the four heating unit RAM files each time through the routine.

It will be recalled that the power pulse repetition rate for each power level is defined by the bit pattern of a 64 bit word with the logical one bit representing an On cycle and logical zero representing an Off cycle, and that a separate Table containing the 64 bit word for each power level is provided for each of four nominal supply voltages. The bits of the control word for each heating unit representing the power level to be applied to it are tested sequentially with one bit being tested each pass through this routine. The state of that tested bit determines whether the triac for the corresponding heating unit will be triggered on or not in the next power signal cycle.

This routine reads the input from the voltage identification circuit (FIG. 5) to identify the voltage range containing the detected supply voltage and performs a Table Look-Up function to find the appropriate control word for each of the four surface units and then checks the state of the appropriate bit in that word. The triac triggering information is then stored in a four-bit word designated TMPON, which is used in the Power Out routine (FIG. 9) to generate the appropriate triac trigger signals.

The variables TABLEA, TABLEB, TABLEC, and TABLED represent the addresses in RAM of the starting locations for the four look-up tables containing the 64 bit control words for the 208, 220, 240 and 260 volt supplies respectively. The addresses and associated bit patterns in Hex representation are shown in Tables I-IV. Each of the 16 digits in the code as shown for each control word is the hexidecimal representation of four binary bits.

The variable designated BITADD represents the location within the 64 bit control word of the bit to be tested with 0 and 63 corresponding to the location of the most significant bit and least significant bit respectively.

An indexing variable n is used to iterate the table look-up loop four times during each pass through the routine, once for each heating unit. The variable PWDADD is the address of the control word representing the power level to be applied to the $n^{th}$ heating unit. As can be seen by reference to Tables I-IV, the address for any particular power word is obtained by multiplying the value of PLVL, which is a number 0 through 15 representing the appropriate one of the available power levels, by a factor of 8 and adding this to the address of the starting location for the particular one of Tables I-IV, represented as TABLEA, TABLEB, TABLEC and TABLED respectively.

Referring to FIG. 8A, on entering this routine the control word TMPON is cleared (Block 226) and a ring counter which counts from 0 to 63 is incremented (Block 228). Inquiry 230 determines if the counter is greater than its maximum count of 63. If so, it is reset to 0 (Block 232). Next BITADD is set equal to the count of the ring counter thereby defining the location within the control word for the bit to be tested for each heating unit (Block 234). The same bit location is tested for each of the heating units.

Next the two bit signal received at ports P8I1 and P8I2 representing the voltage range containing the identified supply voltage is read in (Block 235). Inquiries 236A-236C and Blocks 237A-237D operate to select the correct Look-Up Table for the identified supply voltage. If the supply voltage is less than 210 volts, the variable TABLADD is set equal to TABLEA; if the supply voltage is greater than or equal to 210 but less than 225, TABLADD is set equal to TABLEB; if greater or equal to 225 volts but less than 245 volts, then TABLEC is selected and if the supply voltage is greater than 245 volts, then TABLED is selected.

Referring now to FIG. 8B, having established the appropriate Look-Up Table according to the identified supply voltage, it remains to test the appropriate bit of the control word for each of the four heating units.

The variable n is initialized to zero at Block 238. PWDADD for the power level to be applied to the $n^{th}$ heating unit is determined at Block 240. The state of the bit location defined by the variable BITADD in the control word located at the address PWDADD is then tested (Inquiry 242). If the tested bit is a logical 1, the $n^{th}$ bit of the control word TMPON is set (Block 244). Otherwise, the $n^{th}$ bit of TMPON will remain 0. After the index n is incremented (Block 246) the value of n is checked (Inquiry 248). If greater than 3, signifying that the loop comprising Blocks 240, 244 and 246 and Inquires 242 and 248 has been iterated four times, n is reset (Block 250) and the program branches (Block 252) to the Power Out routine (FIG. 9). If n is not greater than 3, the program returns to Block 240 to test the bit for the power word for the next heating unit. After the appropriate state for all four bits of the variable TMPON have been established, the program branches (Block 252) to the Power Out routine (FIG. 9).

POWER OUT Routine-FIG. 9

The function of this routine is to trigger triacs 24(a)-24(d) (FIG. 4) to implement the triac triggering decision for the next power cycle for each of the four heating units. The triggering of the triacs is synchronized with the positive going zero crossings of the power signal.

Referring now to the routine in FIG. 9, on entering this routine the output latches P500-P503, which control the triacs, are reset (Block 260). Next the program reads in the input from the input port P8I0 representing the state of the zero cross detector (Block 262) and Inquiry 264 checks the state of this input until it switches to a logical 1 signifying the occurrence of a positive going zero crossing of the power signal. When P8I0 equals 1, the program proceeds to Inquiry 266 to sequentially check the four bits of the power word TMPON and set the appropriate one of output latches P500–P503. Index variable n is again used to sequentially check bits 0 through 3. It will be recalled that prior to branching from the PSET routine the n is reset to 0. Inquiry 266 tests the bit for a 1. If it is a 1, the output P50(n) is set (Block 268), n is incremented (Block 270) and Inquiry 272 checks for an n greater than 3. If n is less than 3, the program returns to Inquiry 266 to check the next bit and set the corresponding output port as appropriate. Those ones of output latches P500–P503 associated with bits in the variable TMPON which are in the logical one state are set. Those ones with output latches associated with zero bits in TMPON are not set. In the latter case these latches remain in the reset state since each of the latches is reset upon entering this routine.

In this fashion each bit of the control word TMPON is tested each pass through the Power Out routine. In this way a decision to trigger or not trigger each triac is carried out during each pass through the control program. Once the loop comprising Inquiries 266 and 272 and Blocks 268 and 270 is iterated four times, once for each heating unit, the power control decision for the next power cycle has been implemented and the program then returns (Block 274) to the Scan routine of FIG. 6 to repeat the control program for the next heating unit.

Manual Voltage Identification Embodiment

In the automatic voltage identification embodiment hereinbefore described, the control system automatically adapts to the available power supply by employing a voltage detection circuit which provides a two bit signal to microprocessor 40 which identifies the voltage range containing the supply voltage sensed by the circuit. Alternatively, in accordance with the present invention the voltage identifying means can be provided in the form of a circuit which can be selectively preset to generate a two bit signal identifying the voltage supply to be applied. For example, with a cooking appliance intended for use in a geographic region in which the domestic power supply is known, the circuit can be preset in the factory or upon installation in the home to the appropriate voltage range.

Figure 10:
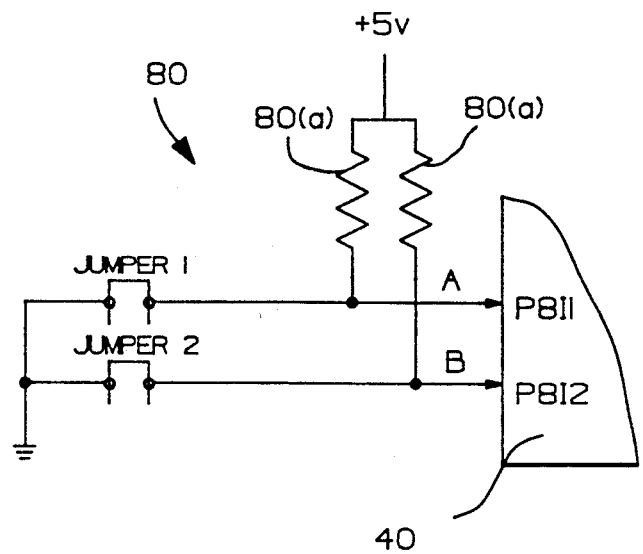
FIG. 10 is a simplified schematic of an embodiment of a manually adjustable circuit as an alternative to the voltage detection circuit of FIG. 4.

A simple jumper circuit which can be so employed is illustrated in FIG. 10. In this embodiment, the jumper circuit 80 of FIG. 10 replaces the voltage detection circuit of FIG. 5, with outputs A and B connecting to I/O ports P8I1 and P8I2 of microprocessor 40 in the circuit of FIG. 4. Manually removable mechanical jumper connectors labeled Jumper 1 and Jumper 2 when inserted (closed) ground pull up resistors 80(a). The jumper connections for the four nominal voltage ranges are shown in Table VI. The input from this circuit will be processed by the microprocessor as hereinbefore described with reference to the automatic voltage identification embodiment.

TABLE VI

| Nominal Line Voltage v | Jumper 1 | Jumper 2 | A | B |
|---|---|---|---|---|
| 208 volts | closed | closed | 0 | 0 |
| 220 volts | open | closed | 1 | 0 |
| 240 volts | closed | open | 0 | 1 |
| 260 volts | open | open | 1 | 1 |

Over-Voltage Protection Embodiment

In accordance with yet another aspect of the present invention, over-voltage protection can be provided for a system intended to operate at a known nominal voltage. In the embodiment hereinafter described, a cooktop of the type illustrated in FIG. 1 is intended for operation with a nominal 240 volt power supply. The control program is simplified by using only Look-Up Tables III and IV. Look-Up Table III will be used when operating under normal operating conditions, i.e. when the supply voltage does not substantially exceed 240 volts RMS. In the event the supply exceeds a predetermined threshold, which in this embodiment is 265 volts RMS, the Look-Up Table of Table IV is employed.

Figure 11:
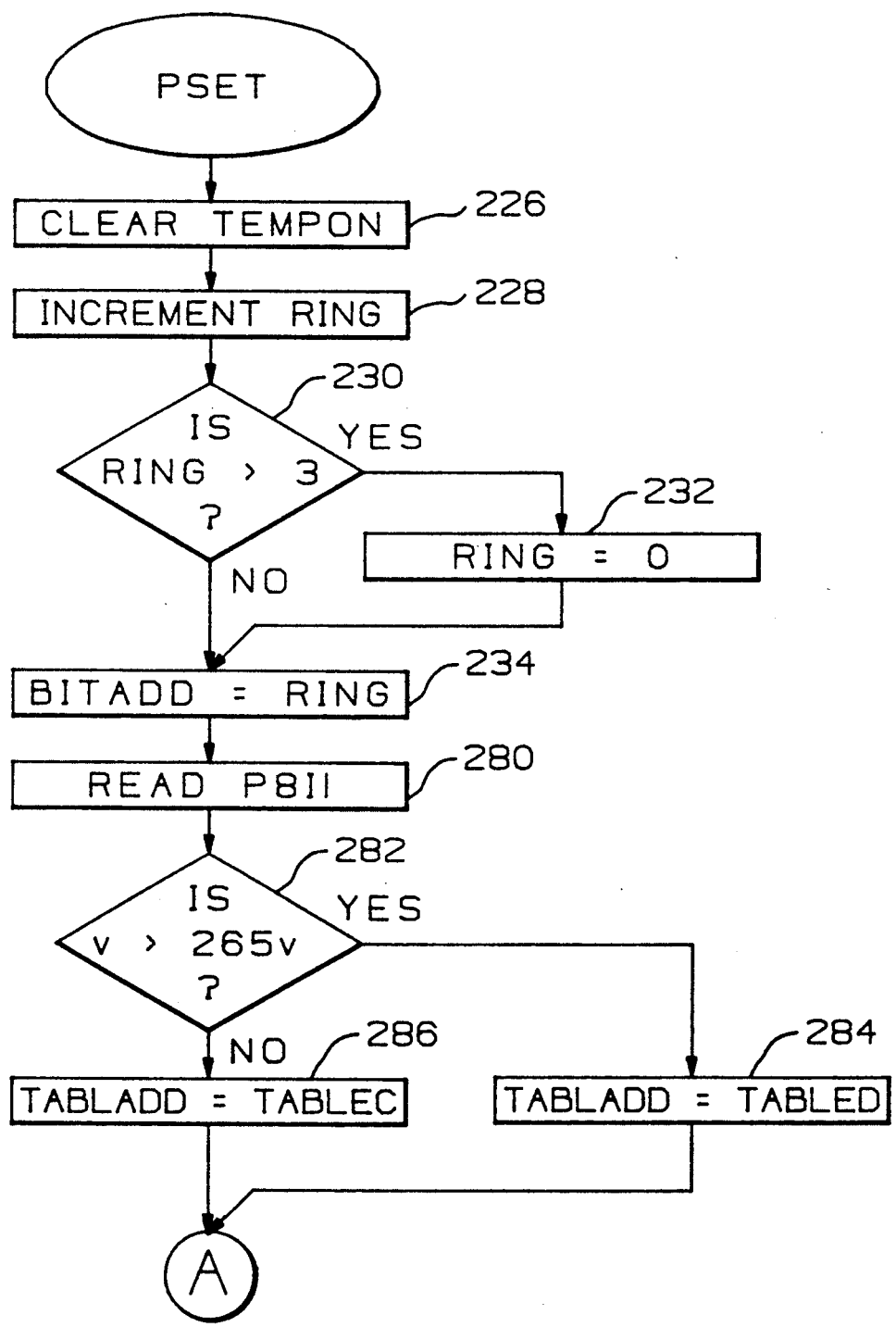
FIG. 11 is a flow diagram of an alternate embodiment of a portion of the PSET routine incorporated in the control program of the microprocessor in the circuit of FIG. 4.

The control program for this embodiment can be substantially the same as that described with reference to the automatic voltage identification embodiment except that the portion of the PSET routine illustrated in FIG. 8A is modified as illustrated in the flow diagram of FIG. 11. As shown in FIG. 11, upon entering the PSET routine the program proceeds as hereinbefore described through Block 234. At this point, the state of input port P8I1 is read in (Block 280). If the supply voltage is greater than 265 volts (logic 1 at Port P8I1) (Inquiry 282), TBLADD is set equal to TABLED (Block 284); otherwise, TBLADD is set to TABLEC (Block 286) and the program proceeds as hereinbefore described.

Figure 12:
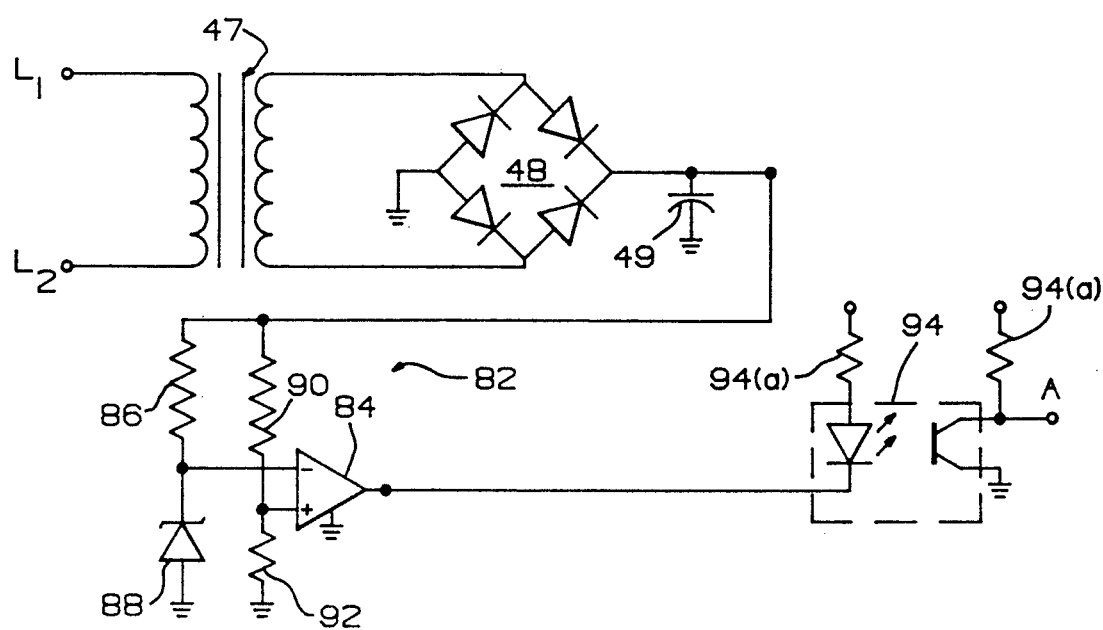
FIG. 12 is a simplified schematic diagram of an alternative embodiment of the voltage detection circuit of FIG. 4.

In this embodiment the voltage identifying means in the circuit of FIG. 4 is provided in the form of the over-voltage detection circuit 82 schematically illustrated in FIG. 12. The circuit 82 of FIG. 12 is essentially a simplified version of the circuit of FIG. 5 with identical components numbered identically. In this circuit the reference voltage for comparator 84 is provided by current limiting resistor 86 and 6 volt zener diode 88. Voltage dividing resistors 90 and 92 are selected such that the voltage at their junction exceeds the reference voltage when the supply voltage exceeds 265 volts RMS. The output of comparator 84 is coupled to the microprocessor by opto-isolating circuit 94. Pull-up resistors 94(a) couple circuit 94 to the 5 v dc supply.

Output A of opto-isolating circuit 94 is connected to IO port P8I1 of microprocessor 40 in the circuit of FIG. 4. If the supply voltage exceeds 265 volts, the output of comparator 84 switches to a logic high state resulting in a logic 1 at output A. Otherwise, the output at A will be in a logic 0 state. As hereinbefore described, microprocessor 40 is programmed to recognize a logic 1 at A as an over-voltage condition.

By the arrangement of this embodiment, protection is provided against damage caused by excess heat generated by the heating elements due to the supply voltage exceeding normal operating limits.

While in accordance with the Patent Statutes specific embodiments of the present invention have been illustrated and described herein, it is realized that numerous modifications and changes will occur to those skilled in the art. For example, the invention could also be used in other applications as well, such as power control for induction cooktops or as a motor control in a clothes washing appliance. It is therefore to be understood that the appended claims are intended to cover all such modifications and changes as fall within the true spirit and scope of the invention.

What is claimed is:

1. An electronic control arrangement for controlling the power applied to an electrical load adaptable to a plurality of different externally supplied input voltages, said arrangement comprising:

user operable selection means for selecting one of a plurality of power settings for the load;

control means comprising memory means for storing a plurality of predetermined control parameter look-up tables including a different table for each of a plurality of predetermined input voltage ranges, each look-up table containing control parameters for controlling power to the load in accordance with each of the plurality of power settings; and input voltage identification means operative to generate a signal representing that one of a plurality of predetermined input voltage ranges for the load containing the externally supplied input voltage;

said control means being responsive to said selection means and said input voltage identification means, and operative to select the control parameters for the selected power setting from that one of said plurality of look-up tables associated with the input voltage range signified by said identification means;

whereby said control means adjusts the power applied to the load to adapt to different input voltages.

2. An electronic control arrangement in accordance with claim 1 wherein said control parameters include a control word for each power setting having a bit pattern which establishes the power switching rate for the load for the corresponding power setting and corresponding voltage range, and wherein said control means further comprises means for applying power to the load at the switching rate established by the selected control word.

3. An electronic control arrangement in accordance with claim 1 wherein said input voltage identification means comprises input voltage sensing means operative to monitor the externally supplied input voltage and generate a signal representing that one of said plurality of predetermined input voltage ranges which includes the sensed input voltage.

4. An electronic control arrangement in accordance with claim 1, wherein said input voltage identification means comprises adjustable input means selectively pre-settable to generate a signal representing that one of said plurality of predetermined input voltage ranges which includes the anticipated input voltage.

5. An electronic control arrangement in accordance with claim 4 wherein said adjustable means comprises a jumper circuit including jumper means selectively connectable to generate said signal representing that one of said plurality of input voltage ranges which includes the anticipated input voltage.

6. A power control arrangement in accordance with claim 1 wherein said plurality of look-up tables include a first look-up table comprising control parameters applicable to normal operating conditions and a second look-up table comprising control parameters applicable to over-voltage operating conditions characterized by an input voltage greater than a predetermined threshold.

7. A power control arrangement for controlling the power applied to an electrical load adaptable to a plurality of different externally supplied input voltages, said control arrangement comprising:

control means comprising memory means for storing a plurality of predetermined control parameter look-up tables, each table containing control parameters for controlling the power applied to the load when the input voltage is within it associated one of a plurality of predetermined nominal input voltage ranges;

adjustable input voltage identification means for enabling the selection of that one of a plurality of predetermined input voltage ranges which includes the input voltage expected to be applied to the load, operative to generate a signal representing the selected input voltage range; and said control means being responsive to said signal from said input voltage identification means, and operative to select the control parameters from that one of said plurality of look-up tables associated with the input voltage range signified by said input voltage identification means;

whereby said control means adjusts the power applied to the load to adapt to different nominal input voltages.

8. A power control arrangement in accordance with claim 7 wherein said control parameters include control words having bit patterns which establish the rate of energizing the load, and wherein said control means is further operative to control the application of power to the load in accordance with the selected control word.

9. A power control arrangement for an electrical load energized by an input voltage supplied by an external power supply, said arrangement comprising:

power setting selection means for selecting one of a plurality of power settings for the load;

input voltage sensing means operative to monitor the input voltage supplied to the load by the external power supply and generate a signal representing that one of a plurality of predetermined input voltage ranges which includes the sensed input voltage;

control means responsive to said input selection means and operative to control energization of the load in accordance with the selected power setting, said control means including:

memory means for storing a plurality of predetermined power control look-up tables, including a different table for each of said plurality of predetermined input voltage ranges, each of said look-up tables comprising a plurality of digital power control words including a power control word corresponding to each of said plurality of selectable power settings, each of said control words being characterized by a bit pattern which establishes the rate of energizing the load to achieve the power output associated with the corresponding power setting when operating the load at an input voltage in the input voltage range associated with that lookup table;

said control means being further responsive to said signal from said input voltage sensing means, and operative to select the power control word for the selected power setting from that one of said plurality of look-up tables associated with the input voltage range signified by said input voltage sensing means;

said control means being further operative to control energization of the load in accordance with the bit pattern of the selected control word;

whereby said control means automatically adjusts the power applied to the load to adapt to different nominal input voltages.

10. A power control arrangement for a cooking appliance of the type having at least one electric heating unit energized by an input voltage supplied by an external power supply, said arrangement comprising:

user operable input selection means for selecting one of a plurality of power settings for the heating unit;

input voltage sensing means for monitoring the input voltage supplied by the external power supply to detect which one of a plurality of predetermined input voltage ranges contains the supplied input voltage, said sensing means being operative to generate a signal identifying the detected input voltage range;

control means responsive to said input selection means and operative to control energization of the heating unit in accordance with the user selected power setting, said control means including:

memory means for storing a plurality of power control look-up tables, each of said look-up tables being associated with a different one of said predetermined input voltage ranges, each look-up table comprising power control words corresponding to each of the user selectable power settings, each of said words comprising a bit pattern which establishes the power switching rate for operating the heating unit at the power level associated with the corresponding power setting, when the input voltage is within the input voltage range associated with that look-up table;

said control means being further responsive to said signal from said input voltage sensing means, and operative to select the power control word for the user selected power setting from that one of said plurality of look-up tables associated with the detected input voltage range;

said control means being further operative to control the selective switching of power to the heating unit at the switching rate established by the bit pattern of the selected power control word;

whereby said control means automatically adapts to different nominal input voltages ranges.

11. A power control arrangement in accordance with claim 9 wherein said plurality of voltage ranges comprise, less than 210 volts, 210-225 volts, 225-245 volts, and greater than 245 volts.

12. A power control arrangement for a cooking appliance of the type having at least one electric heating unit energized by an input voltage supplied by an external power supply, said arrangement comprising:

user operable input selection means for selecting one of a plurality of power settings for the heating unit;

input voltage sensing means operative to monitor the input voltage supplied to the heating unit by the external power supply and generate a signal representing an input voltage greater than a predetermined maximum voltage;

control means responsive to said input selection means and operative to control energization of the heating unit in accordance with the user selected power setting, said control means including:

memory means for storing a plurality of power control look-up tables, including first and second look-up tables corresponding to over-voltage and normal voltage operating conditions respectively, each of said look-up tables comprising a plurality of control words corresponding to each of the user selectable power settings, each of said control words in said look-up tables comprising a bit pattern which establishes the switching rate for controlling energization of the heating unit;

said control means being further responsive to said signal from said input voltage sensing means, and operative to select the power control word for the user selected power setting from said first look-up table when the input voltage is greater than said predetermined maximum and from said second look-up table otherwise;

said control means being further operative to control the application of power to the heating unit in accordance with the bit pattern of the selected power control word;

whereby said control means automatically adjusts the power applied to the heating unit to adapt to overvoltage operating conditions.

13. A power control arrangement in accordance with claim 10 wherein said predetermined maximum voltage is 265 volts.

* * * * *